(12) United States Patent
Kim et al.

(10) Patent No.: US 12,312,478 B2
(45) Date of Patent: May 27, 2025

(54) GRAPHENE INK COMPOSITION AND METHOD OF PREPARING SAME

(71) Applicant: UDUCK Advanced Materials, Yeoju-si (KR)

(72) Inventors: Myeong Gi Kim, Yeoju-si (KR); Seongmin Chin, Yeoju-si (KR); Sung Min Hong, Yeoju-si (KR)

(73) Assignee: UDUCK Advanced Materials, Yeoju-si (KR)

( * ) Notice: Subject to any disclaimer, the term of this patent is extended or adjusted under 35 U.S.C. 154(b) by 0 days.

(21) Appl. No.: 18/221,035

(22) Filed: Jul. 12, 2023

(65) Prior Publication Data

US 2023/0365821 A1 Nov. 16, 2023

Related U.S. Application Data

(62) Division of application No. 16/756,459, filed as application No. PCT/KR2019/005534 on May 14, 2019, now Pat. No. 11,739,228.

(30) Foreign Application Priority Data

| Nov. 21, 2018 | (KR) | 10-2018-0144620 |
| Jan. 7, 2019 | (KR) | 10-2019-0001527 |

(51) Int. Cl.
| C09D 11/037 | (2014.01) |
| B82Y 40/00 | (2011.01) |
| C01B 32/182 | (2017.01) |

(52) U.S. Cl.
CPC .......... C09D 11/037 (2013.01); B82Y 40/00 (2013.01); C01B 32/182 (2017.08)

(58) Field of Classification Search
CPC ....... C09D 11/037; C09D 11/52–11/03; B82Y 30/00–40/00; C01B 32/182
USPC ...................................................... 106/31.92
See application file for complete search history.

(56) References Cited

U.S. PATENT DOCUMENTS

| 2010/0176351 A1 | 7/2010 | Ruoff et al. |
| 2015/0024122 A1 | 1/2015 | Wu et al. |
| 2016/0026846 A1 | 1/2016 | Lin et al. |
| 2016/0276056 A1 | 9/2016 | Stolyarov et al. |
| 2019/0143367 A1 | 5/2019 | Lin et al. |

FOREIGN PATENT DOCUMENTS

| CN | 104292984 A | 1/2015 | |
| CN | 106229245 A | 12/2016 | |
| CN | 106244290 A | * 12/2016 | .......... C10M 125/02 |
| CN | 108178147 A | * 6/2018 | |

(Continued)

OTHER PUBLICATIONS

Johnson, David W. et al., "A manufacturing perspective on graphene dispersions," Current Opinion in Colloid & Interface Science, 2015, vol. 20, pp. 367-382.

(Continued)

*Primary Examiner* — Tri V Nguyen
(74) *Attorney, Agent, or Firm* — Hauptman Ham, LLP

(57) ABSTRACT

The present invention relates to a graphene ink composition including charged chemically modified graphene, a graphene flake, a binder and a solvent, wherein an absolute value of the zeta potential of the charged chemically modified graphene is 25 mV or more.

4 Claims, 3 Drawing Sheets

(56) References Cited

FOREIGN PATENT DOCUMENTS

| KR | 10-0988577 B1 | 10/2010 |
| KR | 10-2011-0016289 A | 2/2011 |
| KR | 10-2012-0039799 A | 4/2012 |
| KR | 10-2015-0076093 A | 7/2015 |

OTHER PUBLICATIONS

International Search Report dated Aug. 21, 2019 for corresponding International Patent Application No. PCT/KR2019/005534, with English machine translation (4 pages).
Written Opinion dated Aug. 21, 2019 for corresponding International Patent Application No. PCT/KR2019/005534 (5 pages).

\* cited by examiner

GRAPHENE INK COMPOSITION AND METHOD OF PREPARING SAME

CROSS-REFERENCE TO RELATED APPLICATIONS

The present application is a division of U.S. patent application Ser. No. 16/756,459, filed on Apr. 15, 2020, which is a national stage filing under 35 U.S.C § 371 of PCT Application No. PCT/KR2019/005534, filed on May 14, 2019, which is based upon and claims the benefit of priorities to Korean Patent Application No. 10-2018-0144620, filed on Nov. 21, 2018, and Korean Patent Application No. 10-2019-0001527, filed on Jan. 7, 2019, in the Korean Intellectual Property Office. The disclosures of the above-listed applications are incorporated herein by reference in their entireties.

TECHNICAL FIELD

The present invention disclosed herein relates to a graphene ink composition and a method of preparing same.

BACKGROUND ART

Graphene is a material having a two-dimensional structure and means carbon atoms disposed into the structure of a honeycomb shape. Graphene is the thinnest material among materials in existence, and has higher current density than copper and various excellent properties such as strength, thermal conductivity and electron mobility. Due to such excellent properties, attempts using graphene in various fields including displays, secondary batteries, solar cells, vehicles and lightings, are being actively conducted.

Particularly, in an industrial field such as electronic, and information and communication fields, high performance, miniaturization and weight lightening of electronic equipments are settled as industrial trends, and graphene receives attention as a material satisfying such industrial trends.

There are many methods for synthesizing graphene, but the graphene is industrially classified according to the producing method thereof. Typically, a graphene flake (GF) produced by exfoliating graphene from graphite crystal and chemical vapor deposition (CVD) graphene produced by a chemical vapor deposition method are present.

The CVD graphene produced by the chemical vapor deposition method is produced by a method of gasifying carbon at a high temperature and depositing on the surface of a metal, and the production of graphene having a large area and high quality may become possible. However, there are defects such that mass production is difficult, and the performance of a process for applying to a practical product is not easy.

On the contrary, the mass production of the graphene flake at a low cost is possible, but the performance thereof is somewhat deteriorated, and applicable product groups are limited.

Accordingly, a novel graphene ink composition which may be easily applied to practical industry is required.

DISCLOSURE OF THE INVENTION

Technical Problem

The present invention is for solving the above-described defects and providing a novel graphene ink composition having high dispersibility and applicable to practical industry.

Particularly, the present invention provides a graphene ink composition which may improve dispersibility and at the same time, decrease sheet resistance and improve vertical thermal conductivity.

Meanwhile, other objects not specified in the present invention will be additionally considered within a deducible scope that may be easily obtained from the detailed description and the effects herein below.

Technical Solution

To achieve the object, a graphene ink composition of the present invention includes charged chemically modified graphene, a graphene flake, a binder and a solvent, and an absolute value of zeta potential of the charged chemically modified graphene is 25 mV or more.

In an embodiment, an amount of the charged chemically modified graphene may be 0.01 to 0.5 wt %.

In an embodiment, an amount of the charged chemically modified graphene may be 0.05 to 0.5 wt %.

In an embodiment, atomic ratios of the charged chemically modified graphene may be 76 to 85 atomic % of carbon, 5 to 25 atomic % of oxygen and 2 to 20 atomic % of nitrogen, and $|O-N|>3$ may be satisfied.

In an embodiment, atomic ratios of the graphene flake may be 90 to 99.4 atomic % of carbon, 0.5 to 5 atomic % of oxygen and 0.1 to 5 atomic % of nitrogen.

To achieve another object, a method of preparing a graphene ink composition according to another embodiment of the present invention includes a step of preparing a first colloid in which charged chemically modified graphene is dispersed; a step of preparing a second colloid in which a graphene flake is dispersed; and a step of preparing a graphene ink composition by mixing the first colloid, the second colloid, a binder and a solvent.

In another embodiment, the step of preparing the first colloid may include a step of deposition treating by treating a graphite flake with an oxidant, and irradiating microwave to prepare an expanded graphite oxide; a step of exfoliating the expanded graphite oxide to prepare a graphene oxide; a step of mixing the graphene oxide prepared with de-ionized water to prepare a graphene oxide suspension; and a step of putting an additive for modifying graphene in the graphene oxide suspension and stirring, and then, preparing the first colloid comprising the charged chemically modified graphene using a large capacity circulation type ultrasonic dispersion system.

In another embodiment, the additive may be any one of an organic single molecule or polymer having an amine group, a hydroxyl group or an azide group.

In another embodiment, the step of preparing the second colloid may include a step of deposition treating by treating a graphite flake with an oxidant, and irradiating microwave to prepare expanded graphite; a step of exfoliating the expanded graphite to prepare a graphene flake; and a step of dispersing the exfoliated graphene flake to prepare the second colloid.

In another embodiment, an amount of the charged chemically modified graphene, which is included in the graphene ink composition prepared by mixing the first colloid, the second colloid, the binder and the solvent, may be 0.05 to 0.5 wt %.

In another embodiment, an amount of the charged chemically modified graphene, which is included in the graphene ink composition prepared by mixing the first colloid, the second colloid, the binder and the solvent, may be 0.01 to 0.5 wt %.

In another embodiment, atomic ratios of the charged chemically modified graphene may be 76 to 85 atomic % of carbon, 5 to 25 atomic % of oxygen and 2 to 20 atomic % of nitrogen, and |O—N|>3 may be satisfied.

In another embodiment, atomic ratios of the graphene flake may be 90 to 99.4 atomic % of carbon, 0.5 to 5 atomic % of oxygen and 0.1 to 5 atomic % of nitrogen.

Advantageous Effects

The graphene ink composition according to an embodiment of the present invention includes charged chemically modified graphene having the absolute value of zeta potential of 25 mV or more and a graphene flake and has excellent dispersibility.

In addition, the amount of the charged chemically modified graphene of the graphene ink composition according to an embodiment of the present invention is controlled to 0.01 to 0.5 wt % and may markedly reduce sheet resistance.

Further, the amount of the charged chemically modified graphene of the graphene ink composition according to an embodiment of the present invention is controlled to 0.05 to 0.5 wt % and may markedly reduce sheet resistance and at the same time, markedly increase vertical thermal conductivity.

Meanwhile, though not explicitly mentioned, effects described in the disclosure and tentative effects, expected from the technical features of the present invention will be treated as described in the disclosure of the present invention.

※ The accompanying drawings are exemplified as references for the understanding of the inventive concept, and the scope of the right of the present invention is not limited thereto.

BEST MODE FOR CARRYING OUT THE INVENTION

Hereinafter detailed description on related known functions will be omitted while explaining the present invention when the known functions are obvious to a person skilled in the art and are considered to unnecessarily obscure the gist of the present invention.

Figure 1:
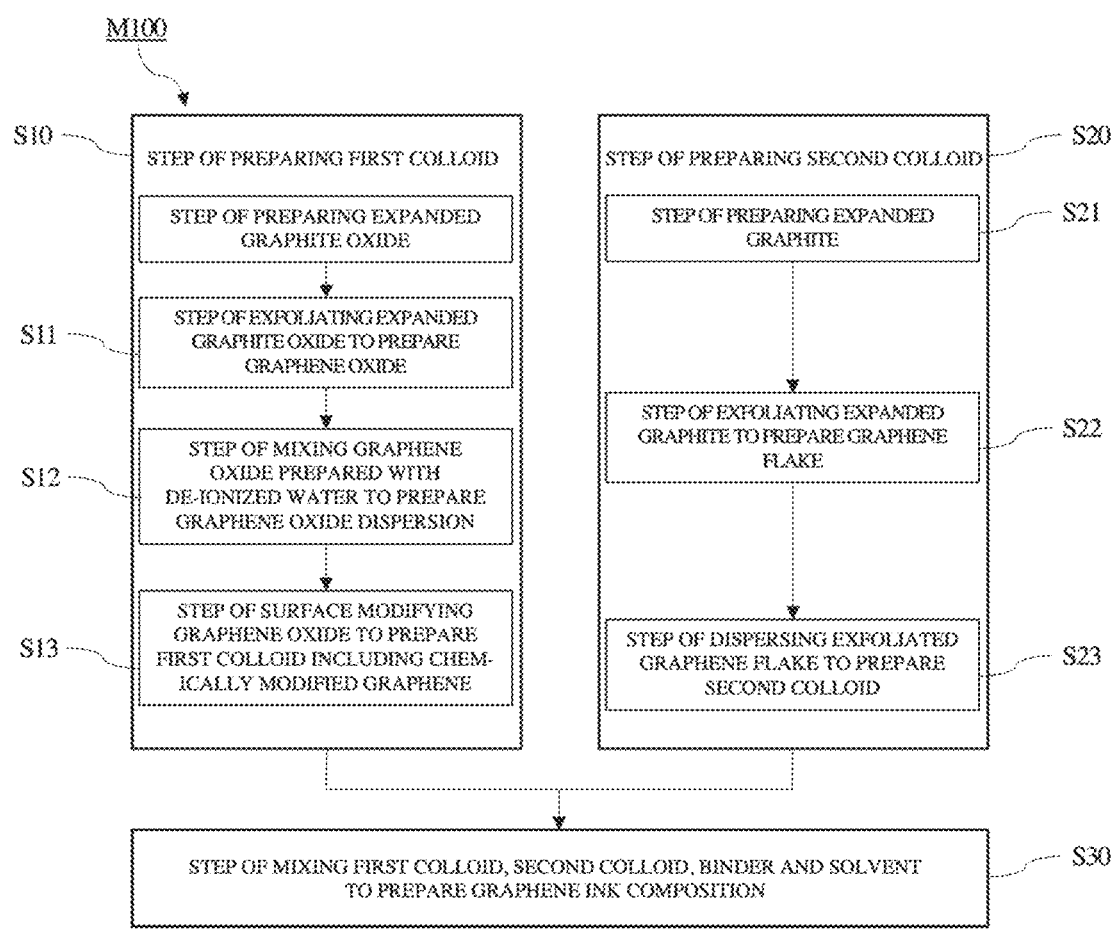
FIG. 1 is a schematic flowchart on the method of preparing a graphene ink composition according to an embodiment of the present invention.

FIG. 1 is a schematic flowchart on the method of preparing a graphene ink composition according to an embodiment of the present invention. Referring to FIG. 1, the method of preparing a graphene ink composition (M100) according to an embodiment of the present invention will be explained.

First, a step of preparing a first colloid in which charged chemically modified graphene is dispersed (S10) is performed.

If the step of preparing a first colloid (S10) is examined in detail, a step of deposition treating a graphite flake with an oxidant and irradiating microwave to prepare an expanded graphite oxide (S11), a step of exfoliating the expanded graphite oxide to prepare a graphene oxide (S12), a step of mixing the graphene oxide thus prepared with de-ionized water to prepare a graphene oxide suspension (S13) and a step of putting an additive for modifying graphene in the graphene oxide suspension and stirring, and then, preparing the first colloid comprising the charged chemically modified graphene using a large capacity circulation type ultrasonic dispersion system. (S14).

The step of preparing an expanded graphite oxide (S11) may be performed by deposition treating a graphite flake in an oxidant for about 30 minutes, and then irradiating microwave with an output power of 500 to 1000 W for 1 to 10 minutes. In this case, as the oxidant, a composite oxidant obtained by mixing two or more among potassium permanganate, sulfuric acid, hydrogen peroxide, and phosphoric acid may be used. As the graphite flake, a graphite flake having an average diameter of 100 to 500 μm may be used. The graphite oxide obtained by such a method is referred to as a microwave expanded graphite oxide (MEGO).

Then, the step of exfoliating the expanded graphite oxide to prepare a graphene oxide (S12) is performed. The step of exfoliating the expanded graphite oxide to prepare a graphene oxide (S12) may be performed by a chemical exfoliation method, for example, by an improved method using phosphoric acid, sulfuric acid and potassium permanganate, which is widely known among chemical exfoliation methods.

After that, the step of mixing the graphene oxide thus prepared with de-ionized water to prepare a graphene oxide suspension (S13) is performed. That is, the exfoliated graphene oxide is dispersed in de-ionized water (DI water) to prepare the graphene oxide suspension. In this case, the graphene oxide suspension is composed of 0.05 to 1 wt % of the graphene oxide and a remaining amount of the de-ionized water.

After preparing the graphene oxide suspension, the step of putting an additive for modifying graphene in the graphene oxide suspension and stirring, and then, preparing the first colloid comprising the charged chemically modified graphene using a large capacity circulation type ultrasonic dispersion system (S14) is performed.

Particularly, 50 to 150 parts by weight of the additive is added to 100 parts by weight of the graphene oxide suspension, and then, stirred at 90-120° C. for 12-36 hours to modify the surface of the graphene oxide.

In this case, an organic single molecule or polymer having an amine group, a hydroxyl group, or an azide group may be used as the additive for modifying graphene. As the organic single molecule or polymer having an amine group, any one selected from the group consisting of ethylenediamine, triethylamine, paraphenylenediamine, 3,3',4,4'-tetraaminobiphenyl, 3,3',4,4'-tetraaminoterphenyl, benzidine, 1,5-diaminonaphthalene, (E)-4,4'-(diazene-1,2-diyl)dianiline, 1,6-diaminohexane, and 1,8-diaminooctane. As the organic single molecule or polymer having a hydroxyl group may use any one selected from the group consisting of poly(vinyl alcohol) (PVA), hot strong alkaline solutions (KOH, NaOH), and hydroxyl-amine. As the organic single molecule or polymer having an azide group may use any one selected from the group consisting of 2-azidoethanol, 3-azidopropane-1-amine, 4-(2-azidoethoxy)-4-oxobutanoic acid, 2-azidoethyl-2-bromo-2-methylpropanoate, chlorocarbonate, azidocarbonate, dichlorocarbene, carbene, arene and nitrene.

After completing surface modification reaction, through a large capacity circulation type ultrasonic dispersion system, 1 ton of the first colloid including the charged chemically modified graphene is prepared per hour. In this case, the charged chemically modified graphene may be dispersed in the solvent.

The solvent may use any one among water, acetone, methyl ethyl ketone, methyl alcohol, ethyl alcohol, isopropyl alcohol, butyl alcohol, polyethylene glycol, tetrahydrofuran, dimethylformamide, dimethyl acetamide, N-methyl-2-pyrrolidone, hexane, cyclohexanone, toluene, chloroform, distilled water, dichlorobenzene, dimethylbenzene, trimethylbenzene, pyridine, methylnaphthalene, nitromethane, acrylonitrile, octadecylamine, aniline, dimethylsulfoxide, methylene chloride, diethylene glycol methyl ethyl ether, ethyl acetate, a cosolvent, amide-based N,N-dimethylformamide (DMF), N-methylpyrrolidone (NMP), ammonium hydroxide hydrochloric aqueous solution, alpha-terpinol, chloroform, formic acid, nitroethane, 2-ethoxy ethanol, 2-methoxy ethanol, 2-butoxy ethanol, 2-methoxy propanol, γ-butyrolactone (γ-GBL), benzyl benzoate, 1-methyl-2-pyrrolidinone (NMP), N,N-dimethylacetamide (DMA), 1,3-dimethyl-2-imidazolidinone (DMEU), 1-vinyl-2-pyrrolidone (NVP), 1-dodecyl-2-pyrrolidinone (N12P), N,N-dimethylformamide (DMF), isopropanol (IPA), 1-octyl-2-pyrrolidone (N8P).

The charged chemically modified graphene prepared by the method may have a negative charge (N type) or a positive charge (P type) according to the kind and amount of the additive. The N type satisfies O/N>1, and the P type satisfies O/N<1. In addition, the charged chemically modified graphene has a lateral size of 50 to 50000 nm, and an average thickness of 2 nm or less.

In Table 1 below, dispersibility and sheet resistance were measured according to the atomic ratios of carbon, oxygen and nitrogen of the charged chemically modified graphene of the first colloid. The sheet resistance was measured by manufacturing a graphene sheet having a thickness of 500 nm using the first colloid.

TABLE 1

| Sample | Kind | C | O | N | |O − N| | Zeta potential (mV) | Sheet resistance (Ω/sq) |
|---|---|---|---|---|---|---|---|
| a1 | GO | 62 | 48 | 0 | 48 | −48 | >$10^{12}$ |
| a2 | CMG-N | 75 | 22 | 3 | 19 | −35 | $1.9 \times 10^5$ |
| a3 | CMG-N | 78 | 18 | 4 | 14 | −27 | $1.4 \times 10^4$ |
| a4 | CMG-N | 81 | 11 | 8 | 3 | −12 | $1.1 \times 10^4$ |
| a5 | CMG-P | 80 | 8 | 12 | 4 | +28 | $1.2 \times 10^4$ |
| a6 | CMG-P | 79 | 7 | 14 | 7 | +31 | $1.2 \times 10^4$ |
| a7 | CMG-P | 83 | 8 | 9 | 1 | +11 | $0.9 \times 10^3$ |

*GO: graphene oxide
*CMG: charged chemically modified graphene

Referring to Table 1, it could be confirmed that the charged chemically modified graphene has higher zeta potential and lower sheet resistance when compared with the graphene oxide. However, generally, if the absolute value of the zeta potential is 25 mV or more, dispersibility is good, and accordingly, |O—N|>3 is preferably satisfied.

Particularly, if the carbon content of the charged chemically modified graphene is 75% or less, the sheet resistance is increased to a level of about $10^5$ Ω/sq, but if the carbon content is greater than 75%, the sheet resistance is reduced to a level of about $10^4$ Ω/sq or less. Accordingly, the preferred atomic ratios of the charged modified graphene are 76 to 85 atomic % of carbon, 5 to 25 atomic % of oxygen and 2 to 20 atomic % of nitrogen.

Together with or separately from the step of preparing the first colloid (S10), a step of preparing a second colloid (S20) is performed.

The step of preparing a second colloid (S20) includes a step of preparing an expanded graphite (S21), a step of exfoliating the expanded graphite to prepare a graphene flake (S22) and a step of dispersing the exfoliated graphene flake to prepare a second colloid (S23).

The step of preparing the expanded graphite (S21) may be performed by deposition treating the graphite flake in an oxidant for about 30 minutes and then, irradiating microwave with an output power of 500 to 1000 W for 1 to 10 minutes. In this case, a composite oxidant obtained by mixing two or more among potassium permanganate, sulfuric acid, hydrogen peroxide, and phosphoric acid may be used as the oxidant. The average diameter of the expanded graphite flake thus prepared is 100 μm or less. Meanwhile, the step of preparing the expanded graphite (S21) may be achieved by purchasing an expanded graphite having an average diameter of 100 μm or less.

Next, the step of exfoliating the expanded graphite oxide to prepare a graphene flake (S22) is performed. The step of exfoliating the expanded graphite oxide to prepare a graphene flake (S22) may use a liquid-phase exfoliation method.

Then, the step of dispersing the exfoliated graphene flake to prepare a second colloid (S23) is performed.

That is, the exfoliated graphene flake is dried and dispersed in a solvent. The solvent may use the same solvent used in the first colloid.

Meanwhile, as shown in Table 1, different from the charged chemically modified graphene, the graphene flake has no electrostatic repulsive force, and dispersibility in a polar solvent is reduced. Accordingly, in order to improve the dispersibility of the graphene flake, the second colloid may further include 1 to 50 wt % of a dispersing assistant based on the graphene.

As the dispersing assistant, a silane compound which may be hydrolyzed to arise condensation reaction may be used. The silane compound which may be hydrolyzed to arise condensation reaction may use at least one selected from the group consisting of tetraalkoxysilanes composed of tetramethoxysilane, tetraethoxysilane, tetra-n-propoxysilane, tetra-i-propxysilane, tetra-n-butoxysilane and mixtures thereof, trialkoxysilanes composed of methyltrimethoxysilane, methyltriethoxysilane, ethyltrimethoxysilane, ethyltriethoxysilane, n-propyltrimethoxysilane, n-propyltriethoxysilane, i-propyltrimethoxysilane, i-propyltriethoxysilane, n-butyltrimethoxysilane, n-butyltriethoxysilane, n-pentyltrimethoxysilane, n-hexyltrimethoxysilane, n-heptyltrimethoxysilane, n-octyltrimethoxysilane, vinyltrimethoxysilane, vinyltriethoxysilane, cyclohexyltrimethoxysilane, cyclohexyltriethoxysilane, phenyltrimethoxysilane, phenyltriethoxysilane, 3-chloropropyltrimethoxysilane, 3-chloropropyltriethoxysilane, 3,3,3-trifluoropropyltrimethoxysilane, 3,3,3-trifluoropropyltriethoxysilane, 3-aminopropyltrimethoxysilane, 3-aminopropyltriethoxysilane, 2-hydroxyethyltrimethoxysilane, 2-hydroxyethyltriethoxysilane, 2-hydroxypropyltrimethoxysilane, 2-hydroxypropyltriethoxysilane, 3-hydroxypropyltrimethoxysilane, 3-hydroxypropyltriethoxysilane, 3-mercaptopropyltrimethoxysilane, 3-mercaptopropyltriethoxysilane, 3-isocyanatepropyltrimethoxysilane, 3-isocyanatepropyltriethoxysilane, '33-glycidoxypropyltrimethoxysilane, 3-glycidoxypropyltriethoxysilane, 2-(3,4-epoxycyclohexyl)ethyltrimethoxysilane, 2-(3,4-epoxycyclohexyl)ethyltriethoxysilane, 3-(meth)acryloxypropyltrimethoxysilane, 3-(meth)acryloxypropyltriethoxysilane, 3-ureido propyltrimethoxysilane, 3-ureido propyltriethoxysilane and mixtures thereof; dialkoxysilanes composed of dimethyldimethoxysilane, dimethyldiethoxysilane, diethyldimethoxysilane, diethyldiethoxysilane, di-n-propyldimethoxysilane, di-n-propyldiethoxysilane, di-i-propyldimethoxysilane, di-i-propyldiethoxysilane, di-n-butyldimethoxysilane, di-n-butyldiethoxysilane, di-n-pentyldimethoxysilane, di-n-pentyldiethoxysilane, di-n-hexyldimethoxysilane, di-n-hexyldiethoxysilane, di-n-heptyldimethoxysilane, di-n-heptyldiethoxysilane, di-n-octyldimethoxysilane, di-n-octyldiethoxysilane, di-n-cyclohexyldimethoxysilane, di-n-cyclohexyldiethoxysilane, diphenyldimethoxysilane, diphenyldiethoxysilane and mixtures thereof.

The graphene flake of the second colloid has a lateral size of 0.3 to 50 μm and an average thickness of 2 to 20 nm. In addition, a graphene flake having the atomic ratios of 90 to 99.4 atomic % of carbon, 0.5 to 5 atomic % of oxygen and 0.1 to 5 atomic % of nitrogen, may be used.

Then, the step of mixing the first colloid, the second colloid, a binder and a solvent to prepare a graphene ink composition (S30) is performed.

The first colloid uses the charged chemically modified graphene having the absolute value of zeta potential of 25 mV or more. By using such charged chemically modified graphene having the absolute value of zeta potential of 25 mV or more, the charged chemically modified graphene may be uniformly dispersed and mixed with the graphene oxide during mixing the first colloid and the second colloid, and the performance improvement of the graphene ink composition may be expected.

The binder may use at least one selected from the group consisting of a thermosetting resin, a thermoplastic resin, a photocurable resin and a conductive polymer. The thermosetting resin may use an urethane resin, an epoxy resin, a melamine resin, a polyimide and mixtures thereof. The thermoplastic resin may use polystyrene and derivatives thereof, a polystyrene butadiene copolymer, polycarbonate, polyvinyl chloride, polysulfone, polyether sulfone, polyether imide, polyacrylate, polyester, polyimide, polyamic acid, cellulose acetate, polyamide, polyolefin, polymethylmethacrylate, polyether ketone, polyoxyethylene and mixtures thereof. The photocurable resin may use an epoxy resin, polyethylene oxide, an urethane resin and mixtures thereof. As a reactive oligomer, epoxy acrylate, polyester acrylate, urethane acrylate, polyether acrylate, thiolate, an organosilicone polymer, an organosilicone copolymer and mixtures thereof, and as a monofunctional monomer as a reactive monomer, 2-ethylhexyl acrylate, octyldecyl acrylate, isodecyl acrylate, tridecyl methacrylate, 2-phenoxyethyl acrylate, nonylphenol ethoxylate monoacrylate, tetrahydrofurfurylate, ethoxyethyl acrylate, hydroxyethyl acrylate, hydroxyethyl methacrylate, hydroxypropyl acrylate, hydroxypropyl methacrylate, hydroxybutyl acrylate, hydroxybutyl methacrylate, etc., may be used. In addition, as a difunctional monomer as a reactive monomer, 1,3-butanediol diacrylate, 1,4-butanediol diacrylate, 1,6-hexanediol diacrylate, diethylene glycol diacrylate, triethylene glycol dimethacrylate, neopentyl glycol diacrylate, ethylene glycol dimethacrylate, tetraethylene glycol methacrylate, polyethylene glycol dimethacrylate, tripropylene glycol diacrylate, 1,6-hexanediol diacrylate and mixtures thereof, may be used. Meanwhile, as a trifunctional monomer as a reactive monomer, trimethylolpropane triacrylate, trimethylolpropane trimethacrylate, pentaerythritol triacrylate, glycidyl pentatriacrylate, glycidyl pentatriacrylate and mixtures thereof, may be used. To the photocurable resin, a benzophenone-based, benzyldimethylketal-based, acetophenone-based, acetophenone-based, anthraquinone-based, and dioxo xanthone-based compound, and mixtures thereof may be added as a photoinitiator. The conductive polymer may use a polythiophene-based monopolymer, a polythiophene-based copolymer, polyacetylene, polyaniline, polypyrrole, poly(3,4-ethylenedioxythiophene), a pentacene-based compound and mixtures thereof. The binder may be included in 1 to 60 wt % based on the total of the graphene ink composition, and according to the amount of the binder, the use of the graphene ink composition may be changed.

The same solvent used for preparing the first colloid and the second colloid may be used, and the amount of the solvent included may be 10 to 98.9 wt % based on the total of the graphene ink composition.

Meanwhile, the composition ratio in the step of preparing the graphene ink composition by mixing the first colloid, the second colloid, the binder and the solvent is determined by the amounts of the charged chemically modified graphene and the graphene flake. In this case, the charged chemically modified graphene and the graphene flake may be included in 0.1 to 30 wt % based on the total of the graphene ink composition.

In Table 2 below and FIG. 2, sheet resistance measured according to the graphene ink composition used in an electrode is shown. The remaining amount of the graphene ink composition is the solvent.

TABLE 2

| Sample | Graphene content (wt %) CMG | Graphene content (wt %) GF | Binder content (wt %) | Sheet resistance (Ω/sq) |
|---|---|---|---|---|
| b1 | 0 | 20 | 10 | 326 |
| b2 | 0.005 | 19.995 | 10 | 311 |
| b3 | 0.01 | 19.99 | 10 | 125 |
| b4 | 0.05 | 19.95 | 10 | 88 |
| b5 | 0.1 | 19.9 | 10 | 35 |
| b6 | 0.2 | 19.8 | 10 | 43 |
| b7 | 0.5 | 19.5 | 10 | 56 |
| b8 | 1.0 | 19.0 | 10 | 310 |
| b9 | 2.0 | 18.0 | 10 | 689 |

*CMG: charged chemically modified graphene
*GF: graphene flake

Figure 2:
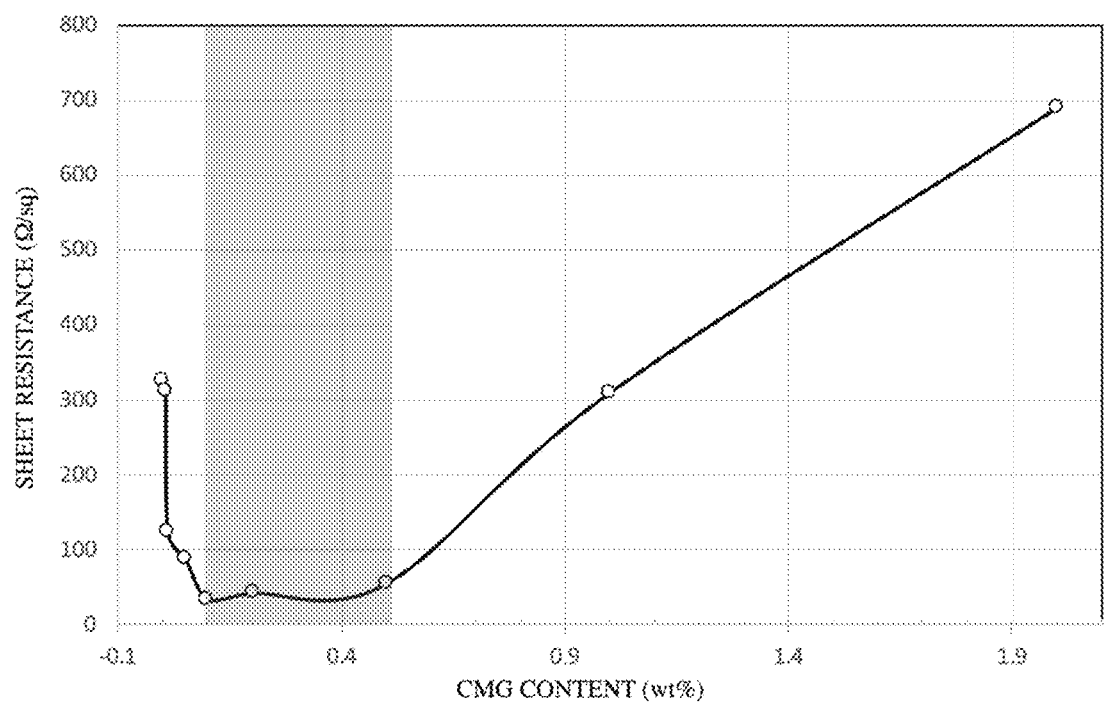
FIG. 2 is a graph obtained by measuring sheet resistance according to the amount of the charged chemically modified graphene of a graphene ink composition according to an embodiment of the present invention.

Referring to Table 2 and FIG. 2, it could be found that if the charged chemically modified graphene is included in 0.01 to 0.5 wt %, the sheet resistance was markedly reduced to 125 Ω/sq or less. This is considered that the charged chemically modified graphene activates the electrical path of the graphene ink composition in a uniformly dispersed state in the graphene ink composition. However, if an excessive amount of the charged chemically modified graphene is mixed when compared with the graphene flake, the low sheet resistance properties of the charged modified graphene acts significantly, and the sheet resistance of the graphene ink composition is rather decreased.

That is, the sheet resistance of the graphene ink composition is greatly influenced by the relative amount of the graphene flake, and accordingly, in order to markedly decrease the sheet resistance of the graphene ink composition, the weight ratio of the charged chemically modified graphene and the graphene flake may be 1:199 to 1:1999 in the graphene ink composition according to an embodiment of the present invention.

In Table 3 below and FIG. 3, sheet resistance was measured according to the graphene ink composition used for thermal interface materials (TIM). The remainder of the graphene ink composition is the solvent.

TABLE 3

| Sample | Graphene content (wt %) CMG | Graphene content (wt %) GF | Binder content (wt %) | Vertical thermal conductivity (W/m · K) |
| --- | --- | --- | --- | --- |
| b1 | 0 | 20 | 40 | 5.1 |
| b2 | 0.005 | 19.995 | 40 | 5.2 |
| b3 | 0.01 | 19.99 | 40 | 6.5 |
| b4 | 0.05 | 19.95 | 40 | 7.5 |
| b5 | 0.1 | 19.9 | 40 | 8.2 |
| b6 | 0.2 | 19.8 | 40 | 8.6 |
| b7 | 0.5 | 19.5 | 40 | 9.3 |
| b8 | 1.0 | 19.0 | 40 | 9.5 |
| b9 | 2.0 | 18.0 | 40 | 9.5 |

*CMG: charged chemically modified graphene
*GF: graphene flake

Figure 3:
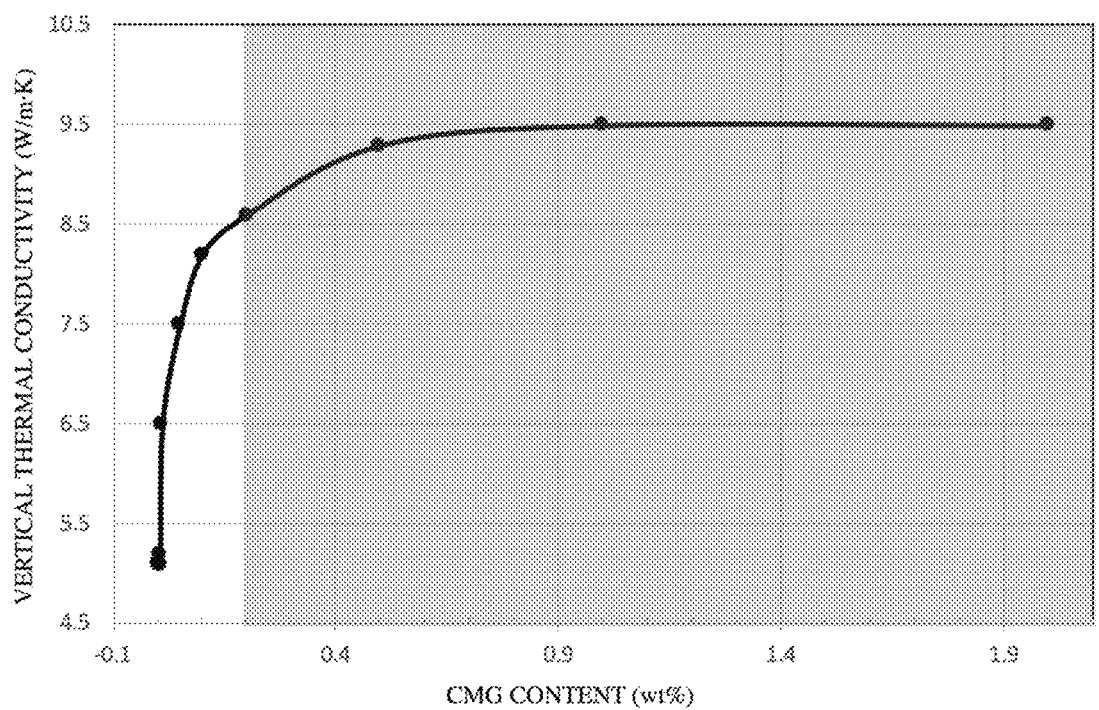
FIG. 3 is a graph obtained by measuring vertical thermal conductivity according to the amount of the charged chemically modified graphene of a graphene ink composition according to an embodiment of the present invention.

Referring to Table 3 and FIG. 3, it could be found that if the charged chemically modified graphene is included in 0.05 wt % or more, the vertical thermal conductivity was increased to 7.5 W/m K or more. This is considered that the charged chemically modified graphene activates the thermal conductive path of the graphene ink composition in a uniformly dispersed state in the graphene ink composition. However, in case where the charged chemically modified graphene is mixed in a sufficient amount and in 1 wt % or more, and activates the thermal conductive path sufficiently, the saturation tendency of thermal conductivity is shown. However, in order to achieve the above-described sheet resistance decreasing effect at the same time, the amount of the charged chemically modified graphene included may be 0.05 to 0.1 wt %.

Meanwhile, the vertical thermal conductivity of the graphene ink composition is greatly influenced by the relative amounts of the chemically modified graphene and the graphene flake, and accordingly, in order to markedly decrease the sheet resistance of the graphene ink composition and improve the vertical thermal conductivity at the same time, the weight ratio of the charged chemically modified graphene and the graphene flake in the graphene ink composition according to an embodiment of the present invention may be 1:399 to 1:1999.

The protection scope of the present invention is not limited to the description and the expression of explicitly explained examples above. In addition, it will be understood that the protection scope of the present invention is not limited by obvious modifications or substitutions in the technical fields of the present invention.

The invention claimed is:

1. A graphene ink composition, comprising:
charged chemically modified graphene, a graphene flake, a binder and a solvent,
wherein
the charged chemically modified graphene has an average thickness of 2 nm or less and the graphene flake has an average thickness of 2 nm to 20 nm,
the charged chemically modified graphene contains oxygen and nitrogen, and an atomic % difference between the oxygen and the nitrogen is more than 3 atomic %,
an absolute value of zeta potential of the charged chemically modified graphene is 25 mV or more, and
a weight ratio of the charged chemically modified graphene and the graphene flake is 1:199 to 1:1999.

2. The graphene ink composition according to claim 1, wherein a weight ratio of the charged chemically modified graphene and the graphene flake is 1:399 to 1:1999.

3. The graphene ink composition according to claim 1, wherein atomic ratios of the charged chemically modified graphene are 76 to 85 atomic % of carbon, 5 to 25 atomic % of oxygen and 2 to 20 atomic % of nitrogen.

4. The graphene ink composition according to claim 1, wherein atomic ratios of the graphene flake are 90 to 99.4 atomic % of carbon, 0.5 to 5 atomic % of oxygen and 0.1 to 5 atomic % of nitrogen.

* * * * *